(12) United States Patent
Hajiyev et al.

(10) Patent No.: US 11,259,092 B2
(45) Date of Patent: Feb. 22, 2022

(54) METHOD OF QUALITY ANALYSIS FOR COMPUTER USER BEHAVOURIAL DATA COLLECTION PROCESSES

(71) Applicant: REALEYES OÜ, Tallinn Harju (EE)

(72) Inventors: Elnar Hajiyev, Morden (GB); Martin Salo, London (GB)

(73) Assignee: REALEYES OÜ, Tallinn Harju (EE)

( * ) Notice: Subject to any disclaimer, the term of this patent is extended or adjusted under 35 U.S.C. 154(b) by 547 days.

(21) Appl. No.: 15/029,983

(22) PCT Filed: Oct. 15, 2014

(86) PCT No.: PCT/EP2014/072105
§ 371 (c)(1),
(2) Date: Apr. 15, 2016

(87) PCT Pub. No.: WO2015/055710
PCT Pub. Date: Apr. 23, 2015

(65) Prior Publication Data
US 2016/0316271 A1  Oct. 27, 2016

(30) Foreign Application Priority Data

Oct. 18, 2013 (GB) .................................... 1318429

(51) Int. Cl.
*H04N 21/475* (2011.01)
*H04N 21/422* (2011.01)
(Continued)

(52) U.S. Cl.
CPC ..... *H04N 21/4758* (2013.01); *H04N 21/4223* (2013.01); *H04N 21/42202* (2013.01);
(Continued)

(58) Field of Classification Search
CPC ....... H04N 21/44213; H04N 21/42202; H04N 21/42203; H04N 21/4223;
(Continued)

(56) References Cited

U.S. PATENT DOCUMENTS 4,603,232 A * 7/1986 Kurland ............. G06K 17/0022
379/92.04
8,081,227 B1  12/2011 Kim et al.
(Continued)

FOREIGN PATENT DOCUMENTS

CN  101548258  9/2009
CN  104185829  12/2014
(Continued)

OTHER PUBLICATIONS

Japanese Office Action in corresponding Japanese Patent Application No. 2016/524114 dated Jul. 8, 2018. 3 pages.
(Continued)

*Primary Examiner* — Nicholas T Corbo

(57) ABSTRACT

Embodiments of the present method comprise activating a data recording component on the computing device to receive information relating to the environment of the computer user and executing a quality check module in the computing device operative to analyse the environment of the computer user. The quality check module performs the steps of: assessing a received signal from the data recording component against a predetermined quality metric to ascertain if an informational content of the received signal meets a predetermined minimum quality to permit computer user behavioural data to be collected therefrom, determining and executing a responsive action where the received signal does not satisfy the quality metric, and initiating a computer user behavioural data collection process to computer user collect behavioural data during the interaction between the com-
(Continued)

puter user and the computing device where the received signal satisfies the quality metric.

23 Claims, 7 Drawing Sheets

(51) Int. Cl.
  *H04N 21/442* (2011.01)
  *H04N 21/4223* (2011.01)
(52) U.S. Cl.
  CPC . *H04N 21/42203* (2013.01); *H04N 21/44209* (2013.01); *H04N 21/44218* (2013.01); *H04N 21/44245* (2013.01)
(58) Field of Classification Search
  CPC ....... H04N 21/44209; H04N 21/44218; H04N 21/44245; H04N 21/4758; H04L 29/08675
  USPC ........................................ 725/9–16
  See application file for complete search history.

(56) References Cited

U.S. PATENT DOCUMENTS

| | | | | |
|---|---|---|---|---|
| 2003/0081834 | A1* | 5/2003 | Philomin | G06F 3/011 382/190 |
| 2007/0150916 | A1 | 6/2007 | Begole et al. | |
| 2008/0101660 | A1 | 5/2008 | Seo | |
| 2008/0240384 | A1* | 10/2008 | Suryanarayana | H04L 12/581 379/88.21 |
| 2011/0141258 | A1 | 6/2011 | Song et al. | |
| 2011/0209066 | A1* | 8/2011 | Sakata | H04H 60/45 715/735 |
| 2011/0293113 | A1* | 12/2011 | McCarthy | H03G 3/32 381/107 |
| 2012/0054664 | A1* | 3/2012 | Dougall | H04N 21/23439 715/772 |
| 2012/0222057 | A1 | 8/2012 | Sadowsky et al. | |
| 2012/0233633 | A1 | 9/2012 | Nishikawa | |
| 2013/0290993 | A1* | 10/2013 | Cheung | H04N 21/4143 725/10 |
| 2014/0119618 | A1* | 5/2014 | Kim | G06K 9/00275 382/118 |
| 2014/0250448 | A1* | 9/2014 | Nielsen | H04N 21/24 725/14 |
| 2014/0257788 | A1* | 9/2014 | Xiong | H04N 21/25816 704/8 |

FOREIGN PATENT DOCUMENTS

| | | |
|---|---|---|
| EP | 1309189 | 5/2003 |
| GB | 2494945 | 3/2013 |
| JP | 2006065447 A | 3/2006 |
| JP | 2010505211 A | 2/2010 |
| JP | 2011233119 A | 11/2011 |
| JP | 2012010856 A | 1/2012 |
| JP | 2013205896 | 10/2013 |
| WO | 2012068193 A2 | 5/2012 |

OTHER PUBLICATIONS

Chinese Patent Office Action dated Jul. 15, 2020 corresponding to Chinese Patent Application No. 201811062806.8; 14 pages.
Chinese Office Action dated Mar. 11, 2020 corresponding to Chinese Patent Application No. 2014800695278, 8 pages.
Chinese Search Report corresponding to Chinese Patent Application No. 2014800695278, dated Oct. 24, 2018; 3 pages.
European Search Report corresponding to European Patent Application No. GB1318429.6, dated Apr. 4, 2014; 4 pages.

* cited by examiner

METHOD OF QUALITY ANALYSIS FOR COMPUTER USER BEHAVOURIAL DATA COLLECTION PROCESSES

CROSS-REFERENCE TO RELATED APPLICATIONS

This application is a U.S. National Stage Application under 35 U.S.C. § 371 of International Patent Application No. PCT/EP2014/072105, filed Oct. 15, 2014 which claims priority to Great Britain Patent Application No. 1318429.6, filed Oct. 18, 2013, which are hereby incorporated by reference in their respective entireties.

FIELD OF THE INVENTION

The invention relates to the collection and processing of behavioural data concerning a computer user. In particular, embodiments of the invention relate to analysis of the quality of the environment of a computer user as recorded by a computing device. According to various embodiments, the quality of information contained in a received signal is used to determine if the environment of the computer user is suitable to the collection of information regarding the computer user's emotional state, e.g., while watching a video or engaging in a computer-based activity, so as to make more efficient use of computational resources.

BACKGROUND OF THE INVENTION

From a commercial viewpoint, it is important to be able to evaluate the performance of content provided online, e.g., an advertisement ("ad"), game, music video, television show, etc. In this regard, it is common to provide a system for computer users to provide feedback by manually rating content, e.g., by selecting a suitable rating value (e.g. a number of stars). It is also similarly common to provide questionnaires or interviews as part of an ad effectiveness tracking scheme.

More recently, techniques for measuring a computer user's emotions, e.g., by facial features tracking or the like, have been incorporated into methods of evaluating the performance of video content. For example, an imaging unit, such as a webcam, can be used to capture images that contain the facial features of a computer user as he or she watches video content. The captured images can be processed to yield information about the computer user's emotions at certain points in the video, which provides valuable feedback as to the performance of the video.

The video and the captured images may be transmitted over the Internet, whereby the feedback may be automatically gathered from a plurality of remote computer users. For example, US 2012/0222057 discloses a system in which a video is embedded in a web-enabled interface that is arranged to collect mental state data for a computer user who watches the embedded video. The web-enabled interface itself can be distributed, e.g., by sending an appropriate URL to a plurality of prospective viewers.

In a related technique, GB 2 494 495 discloses a method of adapting media content based on detected changes in a consumer's emotional state. The specific adaptation may depend on a correlation between the change in emotional state and other detected external information relating to the consumer.

SUMMARY OF THE INVENTION

At its most general, the present invention presents, in various aspects, quality control techniques that aim to improve the efficient use of finite computing resources, as well as the usability of the collected computer user behavioural data received for analysis. The nature of collecting and processing user behavioural data from a plurality (often a very large number) of users, all of whom have varying degrees of control over the environment in which their behavioural data is being collected, means that there is a risk of the collected data being poor or even unusable. Unusable data represents a waste of both computer user time and analysis resources, which are unnecessarily consumed in both the collection and processing of such data.

The invention seeks to reduce the occurrence of collecting and/or processing unusable computer user behavioural data through quality analysis of the environment of the computer user. In some embodiments, e.g., this is achieved by applying an initial filter that prevents the collection of computer user behavioural data from beginning if environmental conditions are not suitable. In other examples, reducing the occurrence of the collection and/or processing of unusable computer user behavioural data is achieved by optimising the data collection conditions in the user environment through a combination of user prompts and responsive adjustments by the user, as well as the appropriate selection of specific collection parameters. Such adjustments and specific collection parameters can occur prior to or periodically throughout the process of collecting and/or processing computer user behavioural data.

The quality control techniques described in conjunction with various embodiments of the invention can also find use in situations where users are paid members of a review panel (as opposed to voluntary participants). Here, the quality control techniques can be used to generate a quality report indicative of the overall quality of computer user behavioural data, e.g., gathered in a collection session, which in turn can be used to assess or otherwise manage the user. For example, where a user is paid to provide behavioural data, payment may be withheld if the quality report indicates that their computer user behavioural data was unusable.

In a first aspect, the present invention provides a method of performing quality analysis of as part of the initiation of a computer user behavioural data collection process during an interaction between a computer user and a computing device. Such computer user behavioural data collection process according to this aspect can take place at any time during which the user is interacting with the computing device.

The method according to this aspect comprises: activating a data recording component on the computing device to detect information relating to the environment of the computer user; executing a quality check module in the computing device operative to analyse the environmental quality of the computer user, wherein the quality check module performs the steps of: assessing a received signal from the data recording component against a predetermined quality metric to ascertain if an informational content of the received signal meets a predetermined minimum quality to permit computer user behavioural data to be collected therefrom; determining and executing a responsive action where the received signal does not satisfy the quality metric; and initiating a computer user behavioural data collection process to collect computer user behavioural data during the interaction between the computer user and the computing device where the received signal satisfies the quality metric.

The interaction between the computer user and the computing device may comprise, e.g., initiating playback of media content on the computing device. Media playback can be instantiated through the use of any number of commercially available software applications for the decoding and rendering of digital media. Furthermore, playback of media content can take place on any number of one or more computing devices that are well known to those of skill in the art including, but not limited to, desktop personal computers (e.g., Windows, Mac and Linux desktop installations), notebook or laptop computers, tables, mobile phones, smartphones, etc. An operating system executing locally on the computing device, which operates in conjunction with and provides an environment in which one or more media playback applications can execute, provides a user interface allowing the user to interact with the computing device and software applications executing thereon.

The responsive action may depend on the nature of the quality metric and the manner in which the received signal does not satisfy the quality metric. For example, the quality metric can set a threshold with regard to ambient noise captured by a microphone or the brightness or contrast level in a capture image or video feed. The responsive action can include displaying a prompt to the user as to the specific quality metric as issue, e.g., informing user about the problem so that he or she can address the issue or otherwise be instructed as to resolve an existing problem. The step of assessing the received signal can be performed repeatedly subsequent to activating the data recording component such that there is opportunity for the environmental conditions to be altered to satisfy the quality metric. The responsive action can include deactivating the data recording component if the quality metric is not satisfied after a period of time has elapsed.

As indicated, the quality metric may be a threshold value regarding a property of the received signal. According to one embodiment, the assessing step comprises extracting the property from the received signal and comparing the extracted property with a threshold set by one or more quality metrics. For example, where the quality metric concerns the brightness level of a collected video feed, a histogram of the brightness of the video feed can be compared with a threshold value set by the quality metric to determine whether or not the quality metric is satisfied. Similarly, where the quality metric concerns the ambient noise, the levels of ambient noise present in an audio feed can be compared against a threshold decibel level to determine whether or not the quality metric is satisfied. Other quality metrics, as well as complex combinations of these exemplary and other quality metrics, are contemplated as falling within the scope of embodiments of the present invention.

In some cases, the quality metric may be more complex. In such embodiments, the quality check module can comprise program code that is operative to transmit the received signal to a remote server for assessment. The quality check module can receive the results of the assessment from the remote server and determine subsequent action accordingly.

Quality analysis of the computer user, which can include analysis of the computing environment as well as the environment in which the computer user is located, can take place in the context of the computer user viewing one or more items of media content on his or her computing device. The media content can be supplied to the computing device in a survey request, wherein the method includes: before initiating playback of media content on the computing device, determining a survey qualification status for the computer user; and, supplying an alternative survey request where the survey qualification status is unacceptable. The alternative survey request can be a simple questionnaire that does not necessitate the collection of computer user behavioural data. This ensures that a willing participant to a survey is not lost simply because the data collection environment does not satisfy the quality metric.

The survey qualification status can be determined based on the received signal from the data recording component, which is assessed against a quality metric to ascertain if information content of the received signal meets a predetermined minimum quality to permit the collection of computer user behavioural data. According to invention, survey qualification status can be determined on the basis of attributes of the environment of computer user (e.g. demographic information, etc.) and/or the computing device, i.e., hardware or software properties of the computing device, which can include attributes such as availability of JavaScript®, the version of the browser used, the amount of available bandwidth, etc.

Attributes of the computer user or computing device can form an initial quality check, which can act as a filter for user environments or devices that are not suitable for the collection of computer user behavioural data or to optimise the behavioural data collection conditions. Embodiments of the invention also contemplate ongoing quality checks, which can ensure that quality is maintained throughout the collection process. Detected attributes may be assessed to ensure that they satisfy predetermined criteria.

According to further aspects of the invention, a method can be provided of assessing the quality of the environment in which computer user behavioural data is collected during playback of media content on a computing device. The method according to this aspect comprises: initiating playback of the media content on the computing device; activating a data recording component on the computing device to detect information relating to a computer user in response to initiating playback of the media content; and in response to initiating playback of the media content on the computing device, executing a quality check module in the computing device.

According to the present aspect, the quality check module performs the steps of: periodically assessing a received signal from the data recording component against a predetermined quality metric to ascertain if an informational content of the received signal meets a predetermined minimum quality to permit computer user behavioural data to be collected therefrom; continuing playback of media content on the computing device and collecting computer user behavioural data where the received signal satisfies the quality metric; and determining and executing responsive action where the received signal does not satisfy the quality metric.

Where the received signal does not satisfy the quality metric, determining and executing a responsive action allows for embodiments of the method to prevent the unnecessary processing of computer user behavioural data that is be collected in an unsuitable environment (e.g., too bright, not enough of user image in frame, excessive ambient noise, etc.), as well as the needless transmission of such data, thereby conserving computing and bandwidth resources.

In accordance with various embodiments of the invention, the responsive action can include one or more of: pausing playback of media content on the computing device, displaying a prompt to the computer user as to a specific quality metric as issue, activating another data recording component to collect computer user behavioural data, transmitting a communication to a third party, etc. Thus, the computer user can be warned if the quality metric is not achieved or otherwise maintained, which can take place after initiation of media playback and/or periodically during media playback.

Alternatively, or in addition to the foregoing, a third party can be notified if the quality of the collected computer user behaviour data drops below a predetermined standard. This can affect whether or not the user is paid (in those instances where the user is being compensated for viewing the media content), or can be used as a trigger to terminate the collection of or ignore previously collected computer user behaviour data. If the interaction is a survey request, the responsive action can include redirecting the user to an alternative questionnaire-type survey.

In accordance with various aspects of embodiments of the invention, the data recording component can be any device suitable for collecting information that is useful for or indicative of a computer user's behaviour. For example, the data recording component can be a webcam, whereby the received signal is a video feed from the webcam. The data recording component can also be a microphone (which can be associated with or separate from the webcam), whereby the received signal is an audio feed from the microphone. Other data recording components contemplated include, but are not limited to, a GPS sensor, a gyroscope, a proximity sensor and a lighting sensor. Those of skill in the art recognize that such hardware components can be deployed as part of both fixed desktop and mobile computing (e.g., smartphone) solutions.

In accordance with another aspect, the invention provides program code that configures a processor to select one or more data recording components, either automatically or manually, from among a plurality of available data recording components associated with the computing device. The selection of a specific recording component allows for the optimization of the collected data. As used throughout, "available" data recording components can mean data recording components that are controlled or otherwise activated or activatable by or via the computing device. For example, a computing device may have a plurality of webcams associated with it. As explained below, the methods according to embodiments of the invention can automatically select the webcam that delivers the better signal for capturing behavioural data. Alternatively, the method can permit the user to select between the webcams. Similarly, the computing device can have access to and control over remotely located recording components and can automatically select such components for the remote capture of computer user behavioural data.

The automated selection process according to this aspect of the invention can be expressed as method of initiating a computer user behavioural data collection process during an interaction between a computer user and a computing device, the method comprising: detecting for the presence of one or more data recording components available to the computing device, each of the one or more data recording components being arranged to detect information relating to environment of the computer user; performing a quality assessment on a received signal from each available data recording component against a predetermined quality metric to ascertain if an informational content of the received signal meets a predetermined minimum quality to permit computer user behavioural data to be collected therefrom; and based on the quality assessment, selecting one of the available data recording component to collect computer user behavioural data during the interaction between the computer user and the computing device.

The manual selection process of another aspect of the invention comprises a method of collecting computer user behavioural data during an interaction between a computer user and a computing device. The method according to the present aspect comprises: detecting for the presence of one or more data recording components available to the computing device, each of the one or more data recording components being arranged to detect information relating to the environment of the computer user; displaying a selection screen on the computing device to prompt the computer user to select one of the available data recording component to be activated; receiving a user selection of an available data recording component; and using the selected available data recording component to collect computer user behavioural data during the interaction between the computer user and the computing device.

The invention according to various aspects of certain embodiments can provide a combination of automated and manual processes, e.g., to give a user a choice between devices that satisfy the predetermined metric, but to automatically ignore devices which do not, e.g., because they are switched off. If there is only one available data recording component, the method according to the present aspect can use the available data recording component to collect computer user behavioural data, which can include collection during playback of media content on the computing device. If there are no available data recording components, the method includes displaying a prompt on the computing device, e.g., requesting the user to activate or otherwise make available one or more data recording components. The process can terminate after a given amount of time has elapsed if no available data recording component is detected. The media content may be part of a survey request. If there are no available data recording components, the method can include supplying an alternative survey request.

In order to ensure that the collection of computer user behavioural data is not disrupted by connectivity problems, embodiments of the invention can comprise loading all of the media content into a memory of the computing device before initiating playback of the media content on the computing device.

The computer user behavioural data can comprise information indicative of the computer user's emotional state, e.g., based on facial images captured via a webcam. The collected computer user behavioural data may be sent to a remote server for analysis, which can include establishing communication between the computing device and the remote server. Accordingly, such embodiments can comprise sending analysis results from the remote server to the computing device or a third party destination, and displaying the analysis results on the computing device or at the third party destination.

When sending computer user behavioural data to a remote server for analysis, the raw data gathered by the one or more data recording components can be part-processed before it is sent to the remote server for analysis. The remote server for analysing the computer user behavioural data can be different from the remote server that is involved in the quality check process mentioned above.

The media content can be sent directly to the computer user, e.g., via email, or can be selected by the computer user from a video-sharing website or social network.

The quality control module according to various aspects of the invention can be provided as or within a downloadable app for executing the behavioural data collection process, can be program code provided as a browser plug-in for execution by other software processes requiring such quality check functionality, can be exposed as an application program interface (API) through which other software processes can make calls for quality check functionality as described herein or through similar structures.

Embodiments of the invention can thus provide a computer program product comprising a computer readable storage medium having stored thereon computer readable instructions, which when executed by a computing device cause that computing device to perform any of the methods described herein. The computer readable storage medium may be accessible by a remote computing device, whereby the computer readable instructions are downloadable for execution on the remote computing device. For example, the computer readable storage medium can be on a cloud-based server, whereby the remote computing device can be any consumer computing device, e.g. PC, laptop, tablet, smartphone, etc. Alternatively, such computer readable instructions can be executed locally on behalf of a remote computing device.

BRIEF DESCRIPTION OF THE DRAWINGS

Embodiments of the invention are discussed below in detail with reference to the accompanying drawings, in which.

DETAILED DESCRIPTION OF CERTAIN EMBODIMENTS OF THE INVENTION

Figure 1:
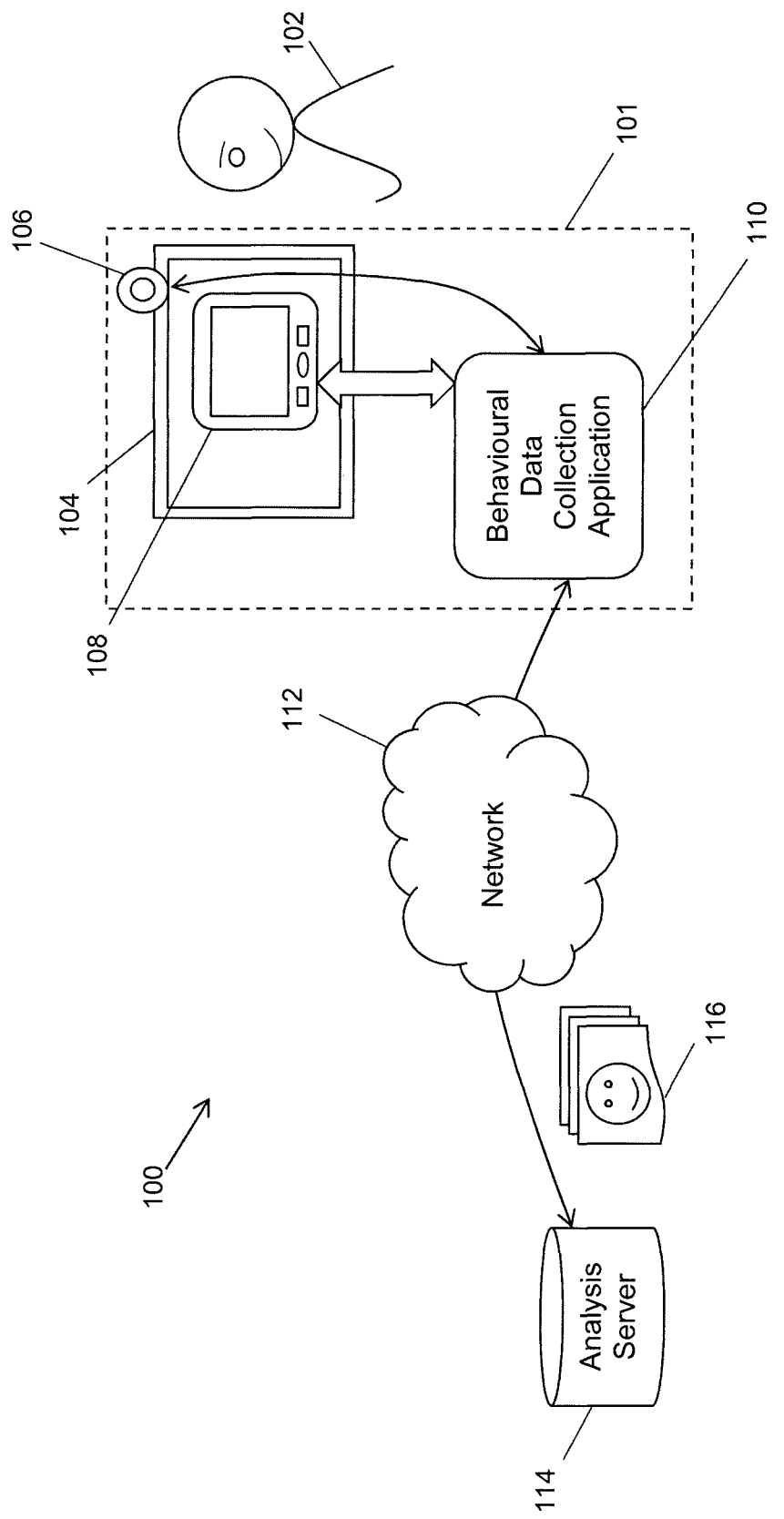
FIG. 1 is a schematic drawing of a system for implementing a method that is an embodiment of the invention.

FIG. 1 depicts the environment 100 within which embodiments of the present invention operate. A user 102 views web-based content on a display 104 associated with a network-enabled client computing device 101, e.g. a PC, laptop computer, tablet computer or smartphone. The client computing device 101 is thus capable of sending and receiving data over a network 112, such as the Internet. The computing device or display therefor 104 is connected to or has inbuilt means for recording behavioural data, such as a microphone, a webcam 106, etc. As is conventional, when the user 102 wishes to view or listen to certain media, a video player 108 (such as e.g. Windows Media Player, QuickTime Player, Audacious, Amarok, Banshee, MPlayer, Rhythmbox, SMPlayer, Totem, VLC, and xine, or an online video player, such as JW Player, Flowplayer and Brightcove) can be launched to present a user interface for playback of the media.

The computing device has a behavioural data collection application 110 associated therewith, e.g., stored in memory thereon, downloadable or otherwise accessible via a network 112. The user 102 may receive on the computing device an invitation to participate in a behavioural data collection exercise, e.g., whilst viewing media content on the media player 108. According to certain embodiments, the behavioural data collection application is not operative to collect computer user behavioural data prior to accepting the invitation to the behavioural data collection exercise, which can be made on a one time basis or prior to the start of any given behavioural data collection exercise. Upon acceptance of an invitation, the behavioural data collection application 110 executes and can communicate with a remote analysis server 114 via the behavioural data collection application to execute and control the behavioural data collection exercise, as discussed below.

The behavioural data collection application 110 can be an emotion tracking application for collecting information indicative of the user's emotional state 116. The behavioural data collection application 110 can also be arranged to collect other types of behavioural data. The collected behavioural data can allow the user's emotions to be tracked during the user's interaction with media played back on the video player 108.

The behavioural data collection application 110 can execute or control an initialisation process, which sets up communication between the analysis server 114 and the hardware that is operative to record behavioural data (e.g., webcam 106). Such initialization process enables collected data 116 (e.g., webcam images) to be transferred therebetween. For example, the initialisation process can comprise setting up (e.g., obtaining authorisation for) communication across the network 112. The collected data 116 can thus be sent over the network to the analysis server 114, where information about the user's emotions can be extracted and used for further processing. Although depicted as physically remote, the functionality of the analysis server 114 can be deployed as part of the behavioural data collection application or otherwise reside locally on the client computing device that is operative to playback the media content on the video player 108.

The present invention is concerned with various aspects of quality control for the collected data 116 sent to the analysis server 114. Each aspect of quality control aims to maximise the chances of usable information 116 being received at the analysis server 114. Accordingly, the implementation of such quality control mechanisms as described and claimed herein allow for the more efficient use of limited computing and network resources by eliminating the need to execute the behavioural data collection application 110 to collect or analyse behavioural data 116 in situations where the quality of such data 116 is unusable or otherwise unreliable. Similarly, network resources 112 are not utilized in a transmission of such data 116 that has been determined to be needless, thereby freeing finite bandwidth for other uses.

Figure 2:
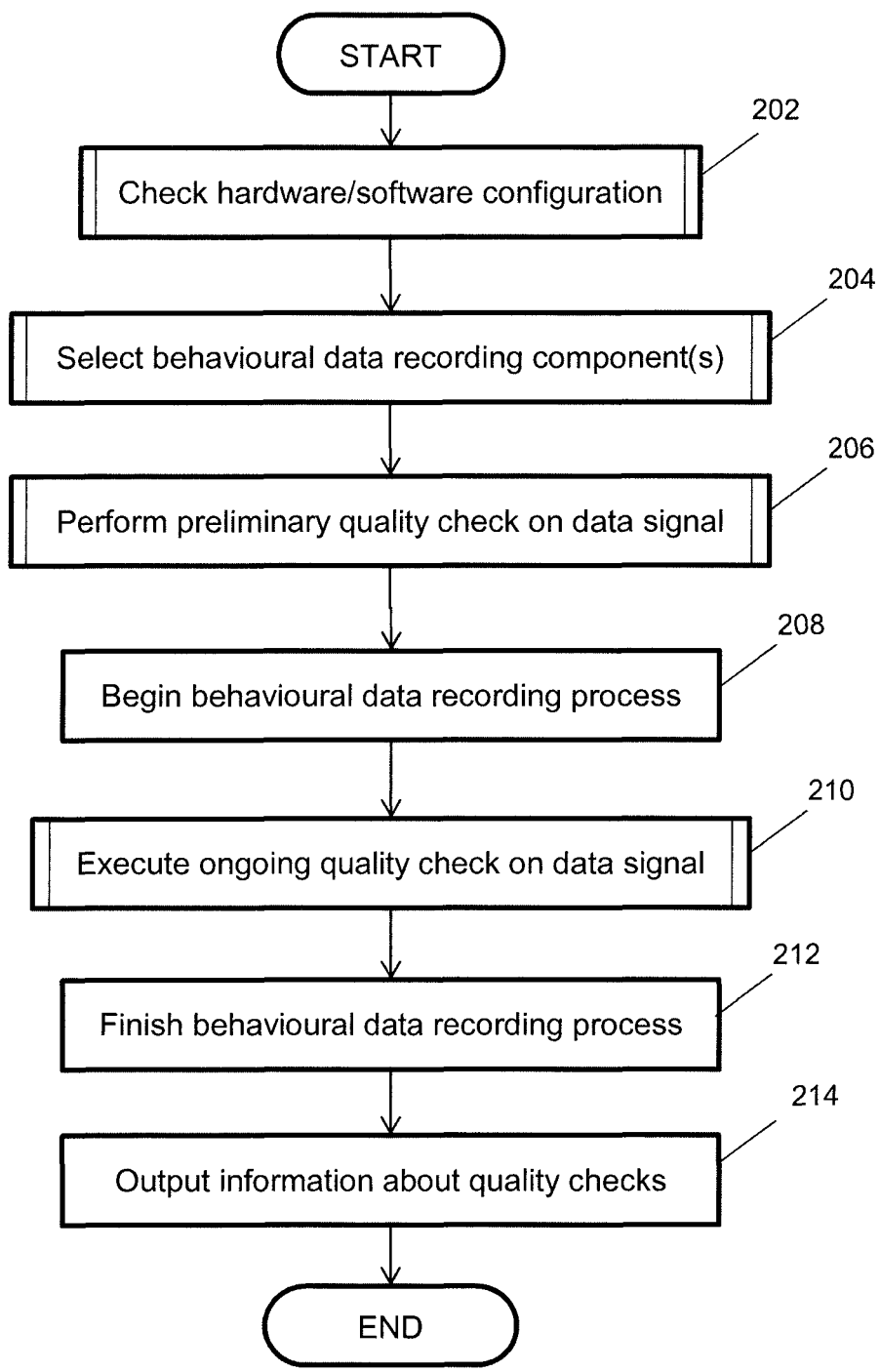
FIG. 2 is a flow chart depicting a method of collecting behavioural data that incorporates various embodiments of the present invention.

FIG. 2 shows an overall method of behavioural data collection in which the various aspects of environmental quality control are discussed and described. The method according to one embodiment begins with a first step 202 of checking the hardware and software configuration of the computing device. This level of quality control aims to ensure that the computing device has sufficient capability to engage in the computer user behaviour collection process, e.g., processing power, hardware functionality and/or software-based functionality to perform data collection and transfer. The details of this step are discussed below in greater detail with reference to FIG. 3.

In a second step 204, the method according to the present embodiment comprises selecting one or more behavioural data recording components, e.g. microphone, webcam, etc.

This step may include a comparison of available signals, e.g., where multiple recording devices are available on the computing device, a selection process is operative to select the component that delivers the highest quality signal. The selection can be automatic, manual or various combinations of both. The details of this step are discussed below in greater detail with reference to FIGS. 4 and 5.

In a third step 206, the method according to the present embodiment comprises performing a preliminary quality check on the signals from one or more selected behavioural data recording components. A given signal upon which a check is performed my indicate, e.g., the brightness levels for the received images, the amount of percentage of the computer user that is within the field of view of the data recording component, ambient noise at the location where the user is located, bandwidth available for transmission of captured images, network latency, etc.

The signals can be assessed against quality metrics either locally (within the computing device) or remotely (e.g. at the analysis server or some other server) to determine whether they meet minimum acceptable quality levels. This step can include providing feedback to the user to take action to improve the quality of the signal that the data recording component is receiving. Alternatively or additionally this step can include automatically configuring the data collection process to maximise quality (e.g. by automatically controlling settings on a webcam, by setting data streaming or sampling rates, etc.). The details of this step are discussed below in greater detail with reference to FIG. 6.

Following satisfactory completion of the preliminary quality check, the method can continue with a fourth step 208 of executing the process of collecting the behavioural data. This can include initiating playback of media content to the user and recording computer user behavioural data for the user during playback of said media content. According to certain embodiments, the media content is fully downloaded to the computing device before playback to ensure there are no disruptions due to loss of connectivity and to maximise the capacity available to transmit and receive signals from the analysis server during playback.

The method can be arranged so that the fourth step 208 of executing the process of collecting the behavioural data does not occur if the preliminary quality check 206 or hardware/software checks 202 do not meet predetermined minimum requirements. In this case, embodiments of the invention are provided that redirect the user, e.g., to an alternative form of data collection. For example, if the computer user behavioural data collection process forms part of a survey request, the method can be arranged to offer the user a questionnaire-based approach, or can redirect the user to an alternative survey.

Upon initiating the process of collecting the computer user behavioural data, the method can include a fifth step 210 of executing a quality check of the collected data signal during collection, which can comprise performing the quality check periodically during the collection process. The check can assess either or both of the quality of the transmission, e.g., by assessing network speed, etc., and the quality of the content, e.g., the usability of the audio or visual data that is being recorded. The ability to periodically perform such quality checks in accordance with various vectors of quality provides for the more efficient use of local and remote computing resources, as well as eliminating the need to consume limited bandwidth provided by the network infrastructure connecting such resources. The details of this step are discussed below in greater detail with reference to FIG. 7.

The method proceeds with a sixth step 212 of finishing the behavioural data recording process, e.g., after playback of the media content has ended. The method can comprise, in a seventh step 214, outputting quality information gathered from the quality checks. This step can comprise storing the gathered quality information in conjunction with the collected computer user behavioural information. Alternatively or additionally, it can comprise communicating the quality information to the user, e.g., via the computing device, or transmitting the information to a third party. For example, the process can comprise generating and displaying (or transmitting for display) a final quality report, which can present an analysis and/or overall assessment of the quality of a given transmission. The final quality report can be generated at the end of the computer user behavioural data recording process. The gathered quality information and/or the final quality report can be used as a basis for further action, e.g., to decide whether or not to pay the user for his or her participation.

Figure 3:
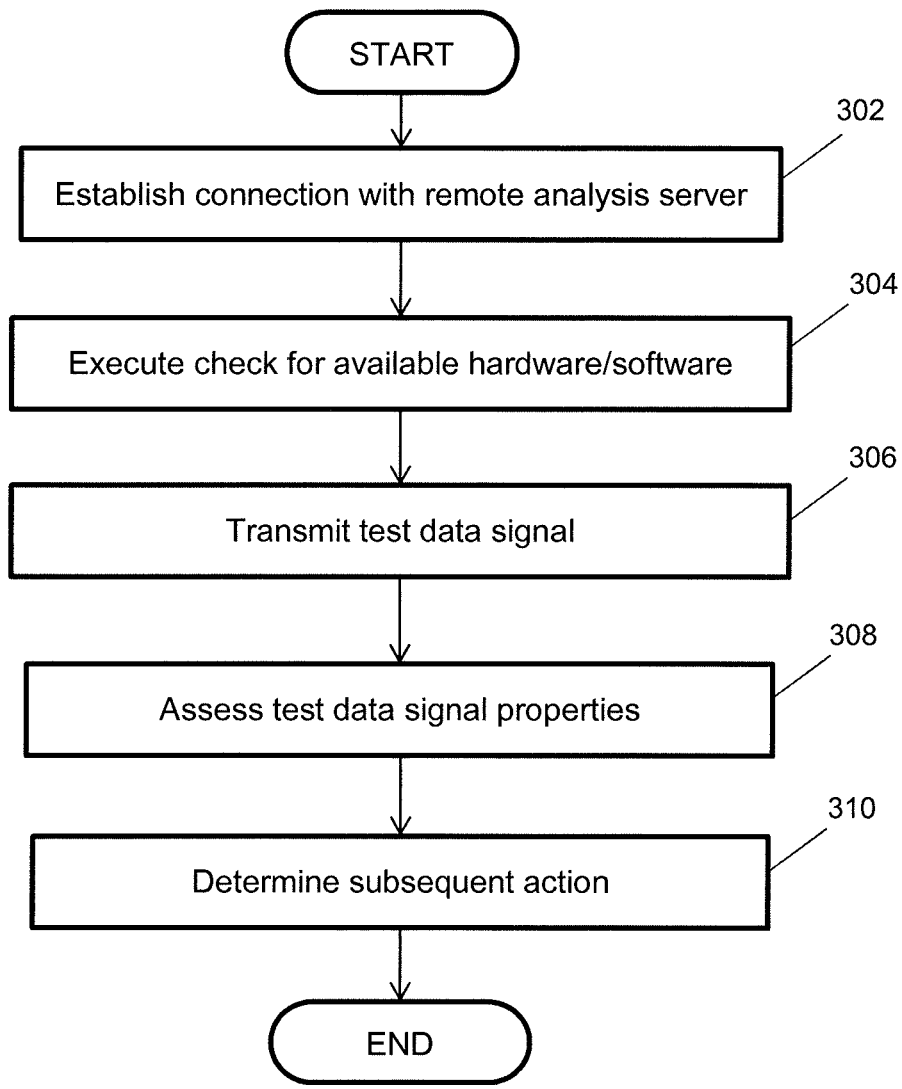
FIG. 3 is a flow chart depicting an initial quality check method that is an embodiment of the invention.

FIG. 3 shows further details of the process for checking the hardware and software configuration of the computing device. According to embodiment illustrated in FIG. 3, there is a step 302 of establishing a connection between the computing device and the remote analysis server, e.g., to transmit collected computer user behavioural data later in the process. The computer user behavioural data collection application can provide (or the computing device can download or otherwise obtain) code for performing a step 304 of initially checking for necessary hardware and software components on the computing device. For example, in order to collect computer user behaviour data, it is necessary to have available behavioural data recording components, e.g., microphone, webcam, and/or display software, a Flash plug-in for the user's media player or web browser, browser software itself, etc. The initial check can be performed locally, which can further take place before connection to the remote analysis server is established. The results of the check can be communicated to the remote analysis server (or some other server participating in the quality check process).

The process can include assessing the quality of the connection, e.g., to ensure that computer user behavioural data can be transmitted at a rate suitable for analysis. The quality of the connection can be assessed 306 by transmitting a test data signal to the analysis server and a step 308 of assessing the properties of the test data signal at the analysis server.

The process can include a final step 310 of determining and executing further action depending on the results of the test signal analysis 308 and hardware/software configuration determination 304. This step can include generating and displaying a prompt for the user to activate or connect one or more behavioural data recording components, if none are detected, or if components are detected but are inactive or inaccessible. The method can include a time out function which terminates the process if necessary hardware or software is not available or if permission to access or transmit data is not granted. Furthermore, the step can include setting parameters (e.g. frame rate, streaming bandwidth) for the collection process based on the quality of the connection.

Figure 4:
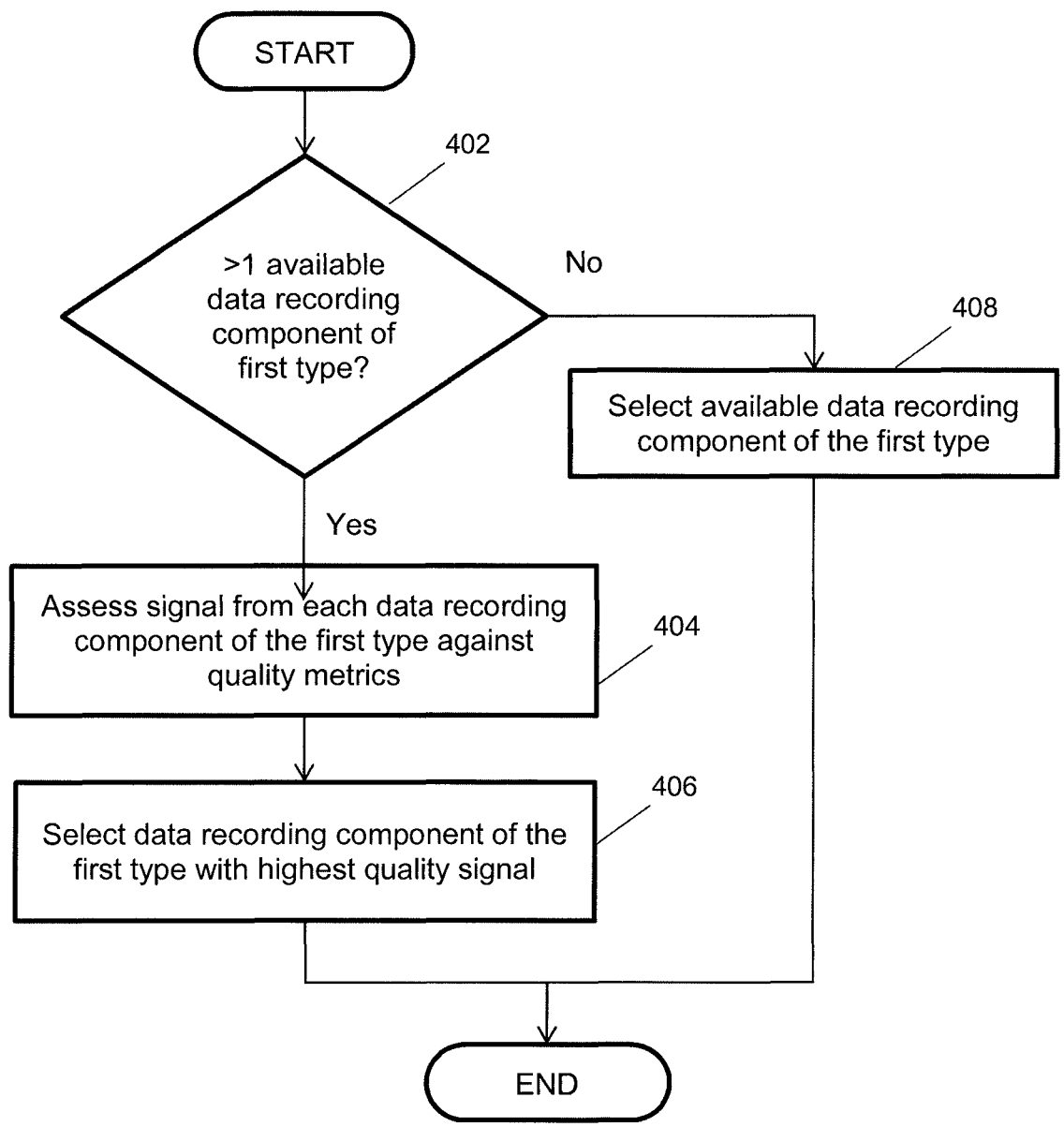
FIG. 4 is a flow chart depicting a data recording component selection method that is an embodiment of the invention.

FIG. 4 illustrates one embodiment of a process for selecting computer user behavioural data recording components. The process of FIG. 4 begins with a step 402 of determining if there is more than one available computer user behavioural data recording component available to the computing device. This determination can follow from the hardware/ software assessment carried out in conjunction with other embodiments discussed above, or can be a stand-alone determination.

If there is more than one available component of each type, the process continues with a step 404 of assessing the signal from each component against a set of quality metrics. This assessment can be performed locally on the computing device, or, if there is not sufficient processing capability on the computing device to perform the assessment rapidly, the assessment can be performed remotely, e.g., at the analysis server or some other remote device. The quality metrics can relate to the general signal quality, e.g., the amount of background noise in an audio signal or brightness level in a video signal. The quality metrics can also relate to the utility of the actual content of the signal, e.g., position and/or orientation of a user's face in a video signal. The assessment can comprise evaluating each quality metric for the signal from each component. The evaluated metric may itself be representative of the signal quality, or can be compared with a predetermined threshold to give a relative indication of quality. The process can continue with a step 406 of selecting the data recording component which provides the highest quality signal.

If there is only one available component, step 402, the process can proceed to step 408 and selecting the available component before continuing with the main computer user behavioural data collection process. If a component does not satisfy the predetermined quality metric mentioned above, the process can automatically treat such component as unavailable. Thus, the mere presence of only one connected component of a certain type does not require that that component actually be used. Indeed, embodiments of the present invention are arranged to not enable or make available such components for use until the quality of the signal is acceptable (e.g., surpasses a given threshold).

Figure 5:
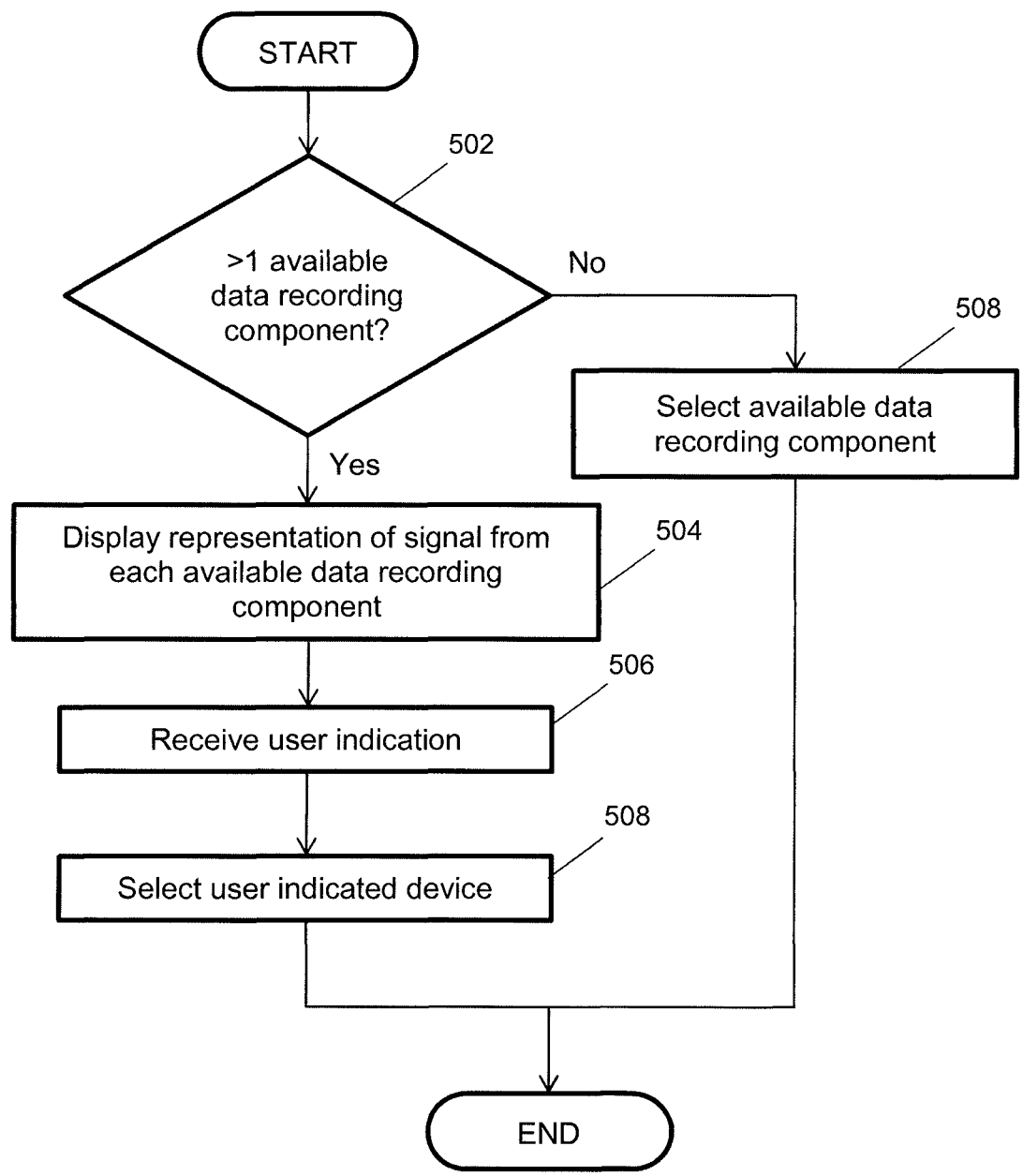
FIG. 5 is a flow chart depicting a webcam selection method that is another embodiment of the invention.

FIG. 5 shows an alternative embodiment of a process for selecting computer user behavioural data recording components (e.g., a webcam) in which the user is given more flexibility to choose the recording component to be used. Similar to FIG. 4, the process begins with a step 502 of determining if there is more than one available data recording component available to the computing device. If there is more than one data recording component available, step 502, the process can continue with a step 504 of displaying on the computing device a representation of the signal from each available data recording component. For example, the representation can be a selectable thumbnail image or miniature video feed from each available webcam. The user is thus able to indicate which of the available data recording components is to be used in the subsequent behavioural data collection process. In the next steps 506 and 508, the computer user behavioural data collection application receives the user's indication and selects the indicated data recording component for use in collecting computer user behavioural data.

If there is only one available data recording component, the user selection process can be bypassed, with process flow proceeding to step 508 and the selection of the available data recording component before continuing with the main computer user behavioural data collection process.

Those of skill in the art should recognize that further embodiments exists in which the methods shown in FIGS. 4 and 5 may be combined, e.g., user selection shown in FIG. 5 can be the default mechanism, but may be overridden by the automatic selection process of FIG. 4 if the signal quality of the available components is such that there is only one viable data recording component. Alternatively, the automatic selection process of FIG. 4 may override user selection when resulting in the selection of a recording component that does not pass the quality checks described herein.

Figure 6:
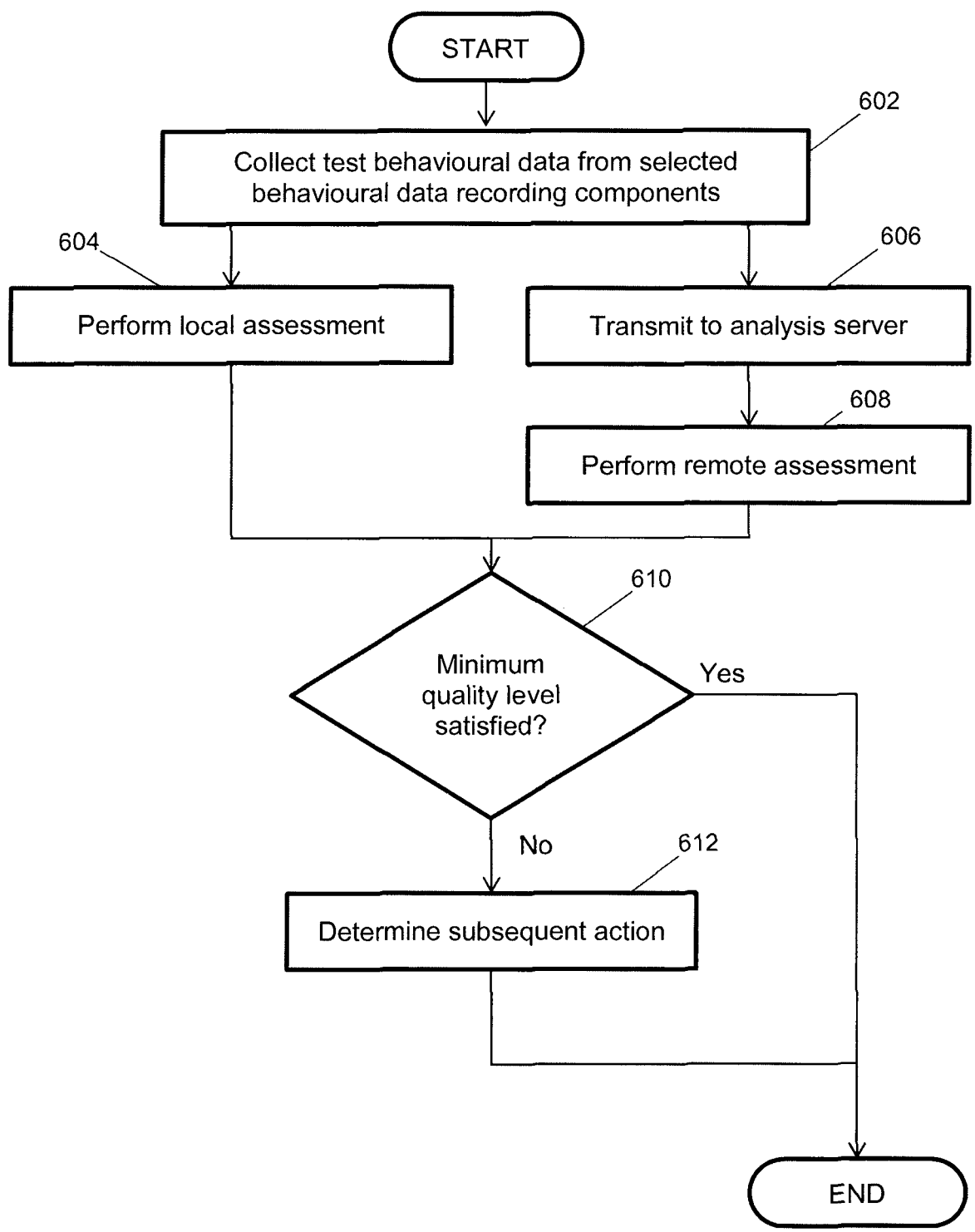
FIG. 6 is a flow chart depicting an initial quality check method that is another embodiment of the invention.

FIG. 6 shows further details of the process for performing a preliminary quality check on the data signal from the selected computer user behavioural data recording component(s). The quality check performed can be similar to those discussed above; in other words, the assessment can be performed locally or remotely, and can be based on quality metrics relating to the general signal quality and the utility of the actual content. However, the purpose of the preliminary check can be to attempt to optimise the quality of the signal before the computer user behavioural data collection process begins, thereby eliminating the need to use limited computing and network resources in the event the signal quality is unacceptable.

The process begins with a step 602 of collecting test computer user behavioural data from one or more selected computer user behavioural data collection components. The process of the present embodiment continues with a step 604 of assessing the test computer user behavioural data locally. In one embodiment, the local assessment can comprise generating a histogram of a property of the test computer user behavioural data signal (e.g., image brightness) and comparing the histogram to a predetermined threshold to determine if the data signal falls within acceptable boundaries. In parallel, the method of the present embodiment can comprise a step 606 of transmitting the test computer user behavioural data to the analysis server, where a step 608 of performing more complex assessment (e.g. using computer vision techniques) can be performed.

The results of the assessment steps 604 and 608 can be fed to the analysis server or computer user behavioural data collection application, either of which can then perform a step 610 of determining if the test data from the signal satisfies a minimum quality level. If the quality level is satisfied, the process continues with the substantive collection of computer user behavioural data.

If the minimum quality level is not satisfied, the analysis server or computer user behavioural data collection application can perform the step 612 of determining appropriate action, e.g., either to improve the quality level of the signal or terminate the process, thereby preventing low quality or unusable data from reaching the analysis server, which eliminates the needless consumption of bandwidth and processing power (both locally and remotely).

The appropriate action can be selected automatically. According to one embodiment, properties of the data recording components or parameters relating to the rate of collection or transmission of data can be adjusted to optimise the quality of signal received at the analysis server. Alternatively or additionally, embodiments can be arranged such that the appropriate action can include the generation and display of on-screen prompts for the user to improve the signal quality. For example, the user can be prompted to change posture or position within the screen, or to alter the surrounding lighting or sound levels. The process can include a time out function that terminates the process if the quality of the signal does not meet the minimum quality level within a predetermined period.

Figure 7:
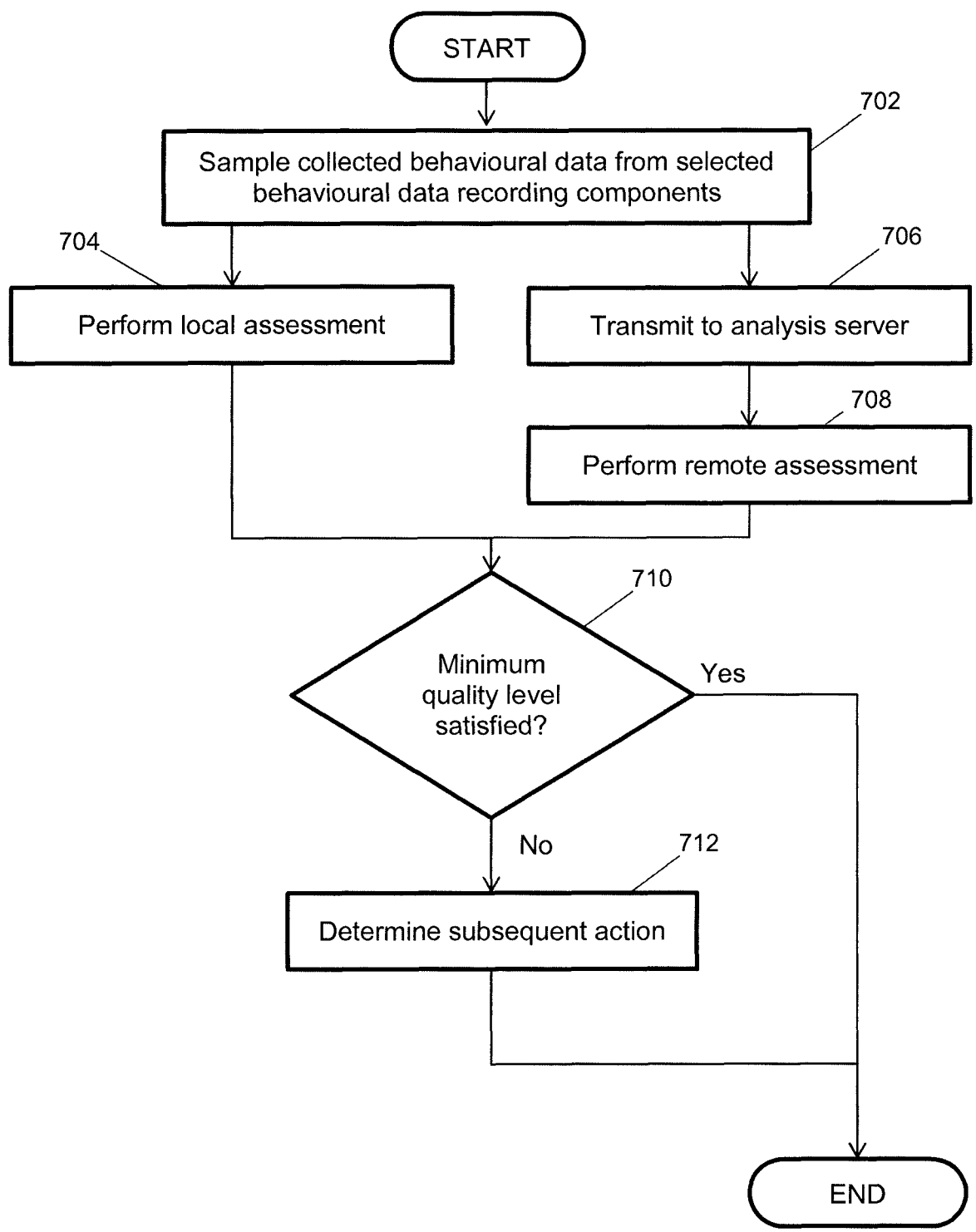
FIG. 7 is a flow chart depicting an ongoing quality check method that is another embodiment of the invention.

FIG. 7 shows further details of the process for performing an ongoing quality check on the data signal from the selected data recording component(s) according to one embodiment of the present invention. The process can be similar to the preliminary quality check shown in FIG. 6, in that it may include a step 702 of sampling of collected computer user behavioural data during the main computer user behavioural data collection process, followed by a step 704 of assessing the sample locally and/or a step 606 of transmitting the sample to the analysis server, where a step 608 of performing more complex assessment is performed.

The results of the assessment steps can be fed to the analysis server or computer user behavioural data collection application, which can then perform a step 710 of determining if the sampled data satisfies a minimum quality level. In this case, the assessment can relate to the same quality parameters as discussed above with reference other embodiments of the invention. In addition, the assessment can analyse the behaviour of the user, e.g., using gaze tracking or attention level. If the quality level is satisfied, the computer user behavioural data collection process continues.

If the minimum quality level is not satisfied, the analysis server or computer user behavioural data collection application can perform the step 712 of determining appropriate action, e.g., either to improve the quality level of the signal or terminate the process, thereby preventing low quality or unusable data from reaching the analysis server, which again eliminates the needless consumption of bandwidth and processing power (both locally and remotely). In this case, the appropriate action can comprise displaying messages to the user, such as to make modifications to the environment in which the computer user behavioural data is collected, or sending communications to a third party. In a specific example, where the user is paid to participate in a computer user behaviour data collection exercise, the ongoing quality check can be used to as a mechanism to withhold payment is sufficient computer user behavioural data is unable to be collected.

FIGS. 1 to 7 are conceptual illustrations allowing for an explanation of the embodiments of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more hardware processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

The invention claimed is:

1. A method of performing environmental quality analysis as part of the initiation of a computer user behavioral data collection process during an interaction between a computer user and a computing device, the method comprising:

activating a data recording component on the computing device to detect information relating to the environment of the computer user;

executing a quality check module in the computing device operative to analyze the environment of the computer user, based on the information detected by the data recording component, wherein the quality check module performs the steps of:

assessing a received signal from the data recording component against a predetermined minimum quality metric by comparing an informational content of the received signal to the predetermined minimum quality metric to ascertain if computer user behavioral data comprising information indicative of the computer user's emotional state can be collected therefrom, determining and executing a responsive action to improve a quality of the informational content of the received signal with regard to the minimum quality metric when the received signal does not satisfy the quality metric, wherein executing the responsive action comprises any one or more of:

displaying a prompt at the computing device, wherein the prompt instructs an adjustment to improve the quality of the received signal, activating another data recording component to collect the computer user behavioral data, and adjusting collection parameters for the data recording component to improve the quality of the received signal, and initiating a computer user behavioral data collection process comprising: extracting the computer user behavioral data from the received signal during a subsequent interaction between the computer user and the computing device where the received signal satisfies the quality metric, wherein the extracted computer user behavioral data comprises information indicative of the computer user's emotional state.

2. A method according to claim 1, wherein the interaction comprises exposure to media content that is played back on the computing device.

3. A method according to claim 2, wherein the step of executing the quality check module occurs before initiating playback of media content on the computing device.

4. A method according to claim 2, comprising supplying the media content to the computing device in a survey request, wherein the method includes:

before initiating playback of media content on the computing device, determining a survey qualification status for the computer user; and supplying an alternative survey request where the survey qualification status is unacceptable.

5. A method according to claim 4, wherein determining the survey qualification status includes determining whether the received signal from the data recording component satisfies a quality metric.

6. A method according to claim 4, wherein determining the survey qualification status includes determining attributes of the environment of computer user and/or the computing device.

7. A method according to claim 2, comprising, before initiating playback of the media content on the computing device, loading all of the media content into a memory of the computing device.

8. A method according claim 2, wherein the media content is selected by the computer user from a video-sharing website or social network.

9. A method according to claim 1, wherein the data recording component is a webcam and the received signal is a video feed from the webcam.

10. A method according to claim 1, wherein the data recording component is a microphone and the received signal is an audio feed from the microphone.

11. A method according to claim 1, wherein the data recording component is selected from the group consisting of:

a GPS sensor, a gyroscope, a proximity sensor, and a lighting sensor.

12. A method according to claim 1, wherein the quality metric concerns one or more of a position and an orientation of the computer user's face represented by the video signal.

13. A method according to claim 1, comprising:

establishing communication between the computing device and a remote server; and sending the collected behavioral data to the remote server for analysis.

14. A method according to claim 13 comprising:

sending analysis results from the remote server to the computing device; and displaying the analysis results on the computing device.

15. A method according to claim 13, comprising part-processing the collected behavioral data before it is sent to the remote server for analysis.

16. The method of claim 1, wherein the received signal comprises a video feed, wherein the predetermined minimum quality metric comprises a threshold value relating to a brightness level of the video feed, and wherein comparing the informational content of the received signal to the predetermined minimum quality metric comprises obtaining a histogram of brightness of the collected video feed and comparing the histogram with the threshold value.

17. The method of claim 1, wherein the received signal comprises an audio feed, wherein the predetermined minimum quality metric comprises a threshold value relating to ambient noise present in the audio feed, and wherein comparing the informational content of the received signal to the predetermined minimum quality metric comprises extracting a property indicative of ambient noise from the audio feed and comparing the extracted property with the threshold value.

18. A method of assessing the quality of the environment in which computer user behavioral data is collected during playback of media content on a computing device, the method comprising:

initiating playback of the media content on the computing device;

activating a data recording component on the computing device to detect information relating to a computer user in response to initiating playback of the media content; and in response to initiating playback of the media content on the computing device, executing a quality check module in the computing device, wherein the quality check module performs the steps of:

periodically assessing a received signal from the data recording component against a predetermined minimum quality metric by comparing an informational content of the received signal to the predetermined minimum quality metric to ascertain if computer user behavioral data can be collected therefrom;

continuing playback of media content on the computing device and extracting the computer user behavioral data from the received signal where the received signal satisfies the quality metric, wherein the extracted computer user behavioral data comprises information indicative of the computer user's emotional state; and determining and executing responsive action to improve a quality of the informational content of the received signal with regard to the minimum quality metric when the received signal does not satisfy the quality metric, wherein executing the responsive action comprises any one or more of:

pausing playback of media content on the computing device, terminating collection of the computer user behavioural data;

displaying a prompt at the computing device, wherein the prompt instructs an adjustment to improve the quality of the received signal, activating another data recording component to collect the computer user behavioral data, and adjusting collection parameters for the data recording component to improve the quality of the received signal.

19. A method according to claim 18, wherein the responsive action
further comprises
transmitting a communication to a third party.

20. The method of claim 18, wherein the received signal comprises a video feed, wherein the predetermined minimum quality metric comprises a threshold value relating to a brightness level of the video feed, and wherein comparing the informational content of the received signal to the predetermined minimum quality metric comprises obtaining a histogram of brightness of the collected video feed and comparing the histogram with the threshold value.

21. The method of claim 18, wherein the received signal comprises an audio feed, wherein the predetermined minimum quality metric comprises a threshold value relating to ambient noise present in the audio feed, and wherein comparing the informational content of the received signal to the predetermined minimum quality metric comprises extracting a property indicative of ambient noise from the audio feed and comparing the extracted property with the threshold value.

22. A non-transitory computer program product comprising a computer readable storage medium having stored thereon computer program code, which when executed by a computer device cause the computing device to perform a method of environmental quality analysis as part of the initiation of a computer user behavioral data collection process during an interaction between a computer user and a computing device, the computer program product comprising:
program code for activating a data recording component on the computing device to detect information relating to the environment of the computer user;
program code for executing a quality check module in the computing device operative to analyze the environment of the computer user based on the information detected by the data recording component, wherein the quality check module performs the steps of:
program code for assessing a received signal from the data recording component against a predetermined minimum quality metric by comparing an informational content of the received signal against the predetermined minimum quality metric to ascertain if computer user behavioral data comprising information indicative of the computer user's emotional state can be collected therefrom,
program code for determining and executing a responsive action to improve a quality of the information content of the received signal with regard to the minimum quality metric when the received signal does not satisfy the quality metric, wherein the executing the responsive action comprises any one or more of:
displaying a prompt at the computing device, wherein the prompt instructs and adjustment to the quality of the received signal,
activing another data recording component to collect the computer user behavioral data, and
adjusting collection parameter for the data recording component to improve the quality of the received signal, and
program code for initiating a computer user behavioral data collection process comprising: extracting computer user behavioral data from the received signal during a subsequent interaction between the computer user and the computing device where the received signal satisfies the quality metric, wherein the collected computer user behavioral data comprises information indicative of the computer user's emotional state.

23. A non-transitory computer program product according to claim 22, wherein the computer readable storage medium is accessible by a remote computing device, whereby the computer program code is downloadable for execution on the remote computing device.

\* \* \* \* \*